(12) United States Patent
Rubin (10) Patent No.: US 11,123,667 B2
(45) Date of Patent: Sep. 21, 2021

(54) WATER COOLER FILTER WITH SECURE BAYONET-TYPE CONNECTION

(71) Applicant: BHRS GROUP, Lakewood, NJ (US)

(72) Inventor: Jonathan Rubin, Lakewood, NJ (US)

(73) Assignee: BHRS GROUP, Lakewood, NJ (US)

( * ) Notice: Subject to any disclaimer, the term of this patent is extended or adjusted under 35 U.S.C. 154(b) by 743 days.

(21) Appl. No.: 16/004,584

(22) Filed: Jun. 11, 2018

(65) Prior Publication Data

US 2019/0374885 A1    Dec. 12, 2019

(51) Int. Cl.
*B01D 35/30*    (2006.01)
*C02F 1/00*    (2006.01)
(Continued)

(52) U.S. Cl.
CPC .............. *B01D 35/30* (2013.01); *C02F 1/001* (2013.01); *B01D 46/0004* (2013.01);
(Continued)

(58) Field of Classification Search
CPC ............ B01D 35/30; B01D 2201/4046; B01D 2201/4053; B01D 2201/4061; B01D 2201/291; B01D 2201/30; B01D 2201/303; B01D 2201/305; B01D 2201/52; B01D 2201/4015; C02F 1/001; C02F 2307/10; F25D 31/002; F25D 2323/121
See application file for complete search history.

(56) References Cited

U.S. PATENT DOCUMENTS 5,456,830 A * 10/1995 Stanford .............. B01D 35/153
                                                                    210/235
10,226,722 B1 * 3/2019 Baird .................... B01D 35/143
(Continued)

FOREIGN PATENT DOCUMENTS

| CA | 2999315 A1 * | 9/2019 | ........... B01D 35/153 |
| CA | 2999315 A1 | 9/2019 | |
| WO | 2017151481 A1 | 9/2017 | |

OTHER PUBLICATIONS

CA 3045692 Exam Report, dated Aug. 18, 2020 (5 pages).
CA 3045692 Exam Report, dated Feb. 19, 2021 (5 pages).
GB1908240.3 Exam Report, dated Jun. 11, 2020 (5 pages).

*Primary Examiner* — Lucas A Stelling
*Assistant Examiner* — Angel Olivera
(74) *Attorney, Agent, or Firm* — Lombard & Geliebter LLP; Antonio Papageorgiou (57) ABSTRACT

A filter for a water cooler includes a housing having a surface and a cavity with cavity ports. The filter end is adapted to be received in the housing. The filter end includes a cylindrical base having a surface and a neck extending from the surface. The neck has filter ports and a side surface. The side surface has oppositely directed axially extending elongated protrusions configured to be received in channels in the housing. The base surface includes a complex set of protrusions which are adapted to be received in a similarly configured set of recesses in the housing surface. The protrusions/recesses may take the form of letters, numbers or symbols. The filter end is be fully seated in the housing in bayonet-type fashion to connect the filter ports and the housing ports o permit water to flow through the filter from the water supply to the water cooler.

21 Claims, 4 Drawing Sheets

(51) Int. Cl.
   *F25D 31/00* (2006.01)
   *B01D 46/00* (2006.01)
(52) U.S. Cl.
   CPC .... *B01D 2201/291* (2013.01); *B01D 2201/30* (2013.01); *B01D 2201/301* (2013.01); *B01D 2201/303* (2013.01); *B01D 2201/305* (2013.01); *B01D 2201/4015* (2013.01); *B01D 2201/4046* (2013.01); *B01D 2201/4053* (2013.01); *B01D 2201/4061* (2013.01); *B01D 2201/52* (2013.01); *C02F 2307/10* (2013.01); *F25D 31/002* (2013.01); *F25D 2323/121* (2013.01)

(56) References Cited

U.S. PATENT DOCUMENTS

| | | | |
|---|---|---|---|
| 2004/0144710 A1* | 7/2004 | Bassett | B01D 27/106 210/234 |
| 2007/0199876 A1 | 8/2007 | Tubby | |
| 2009/0242470 A1 | 10/2009 | Muenkel | |
| 2010/0000919 A1* | 1/2010 | Kim | B01D 35/153 210/136 |
| 2013/0240418 A1* | 9/2013 | Dhingra | B01D 29/90 210/85 |
| 2014/0110331 A1* | 4/2014 | Baird | B01D 27/106 210/346 |
| 2014/0175000 A1 | 6/2014 | Reid | |

* cited by examiner

WATER COOLER FILTER WITH SECURE BAYONET-TYPE CONNECTION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to water cooler filters of the type which are connected to the water cooler by inserting an end of the filter into a cavity in the filter adapter housing associated with the water cooler in bayonet-type fashion and more particularly to such a filter with enhanced security which requires two separate interlocks to properly seat the filter in the housing.

2. Description of Prior Art Including Information Disclosed Under 37 CFR 1.97 and 1.98

The invention relates to a filter for a water cooler of the type that is connected to the filter adapter housing associated with the water cooler in bayonet-type fashion. The front end of the filter is inserted into a cavity in the filter adapter housing and rotated relative to the housing to align intake and outflow ports in the filter end with corresponding ports in the housing. Once fully seated, a fluid tight connection between the filter and the water cooler is established.

Conventional water filters of this type include a hollow cylindrical body within which the filter material is situated. The front end of the filter includes a generally cylindrical base including a surface extending in a direction perpendicular to the axis of the filter and a neck which extends from the base surface. The filter ports are located on the neck.

The housing includes a housing surface extending in a direction perpendicular to the filter axis and a cavity adapted to receive the neck of the front end of the filter. The cavity has a shape corresponding to the shape of the neck. The cavity includes ports connected to receive unfiltered water from the water supply and provide filtered water from the filter to the water cooler.

The neck of the filter end is provided with one or more axially extending elongated projections which are received in corresponding axially extending channels in the cavity wall as the front end of the filter is inserted into the housing. Once the front end of the filter is fully inserted into the cavity such that the base surface abuts the housing surface, the projections clear the channels and enter a circumferential channel in the housing cavity such that the filter can be rotated relative to the housing to a position in which the filter end is fully seated in the housing and the fluid connections are made between the filter ports and the housing ports.

However, while the axially directed projections cooperate with the channels in the housing to provide an interlock, for some applications the interlock of conventional filters is not sufficiently secure. Accordingly, an improved interlock configuration for a water cooler filter of this type is desirable.

BRIEF SUMMARY OF THE INVENTION

The present invention provides an additional interlock which prevents the front end of the filter from being rotated to its fully rotated seated position after the first interlock is interengaged unless the parts of additional interlock are also interengaged. The second interlock serves the additional purpose of enhancing the fluid connection between the filter and the housing to prevent leaking.

In the present invention, the filter cannot be fully seated unless the parts of a second interlock are interengaged. The second interlock includes one or more protrusions on a surface of the filter base which extends in a direction substantially perpendicular to the axis of the filter. When the filter end is fully inserted in the housing cavity, the base surface of the filter abuts a housing surface which also extends in a direction substantially perpendicular to the filter axis. The housing surface has one or more recesses which are configured to receive the protrusions on the base surface, when the filter end is in its fully rotated position.

The base surface has one or more inclined surface portions from which protrusions extend. As the filter end is rotated toward its fully rotated position, the inclined portion of the base surface causes the filter base to move away from the housing a small distance to permit the recesses in the housing surface to align with and receive the protrusions on the inclined portion of the filter end surface, forming the second interlock. In that fully rotated position, the filter end is fully seated in the housing, with the ports in the filter aligned with the ports in the housing, allowing water to pass through the filter to the water cooler.

The inclined portion of the base surface needs to be inclined only enough to permit the housing surface to move over the protrusions on the base surface such that the protrusions can be aligned with and be received into the recesses. Accordingly, the incline need only be slightly more than the height of the protrusions on the base surface. However, without the incline, the filter cannot be rotated to its fully rotated position and the filter cannot be properly seated in the housing. so that the housing.

Preferably, the protrusions and the recesses are formed of in complex sets which must match exactly or the filter cannot be properly seated in the housing. The protrusions preferably extend in a generally horizontally pattern along the inclined base surface portion. The protrusion may extend in an arcuate configuration to follow the contour of the base surface. The recesses in the housing surface must follow the same pattern.

The complex set of protrusions and matching recess can be any shape and size. However, it is desirable that they have a unique shape, include multiple spaced parts and extend in a linear or arcuate fashion along the abutting surfaces. Examples of such interlocking sets may include geometric shapes, symbols, characters of various types such as letters, numbers or combinations thereof and may form words, logos, designs and the like.

In accordance with one aspect of the present invention, a filter is provided for a water cooler of the type having a housing with a cavity and cavity ports. The filter includes an end. The end of the filter has a substantially cylindrical base. The filter base has a base surface and a neck extending from the base surface. The neck has filter ports and a side surface. The side surface of the neck includes an elongated protrusion. The base surface includes an inclined surface portion having one or more protrusions. The filter end is configured to be received in the housing in bayonet-type fashion to align the filter ports and the ports of the cavity.

One or more protrusions extend from the inclined base surface portion and preferably take the form of a complex set of protrusions selected from the following group: geometric shapes, symbols, characters of various types such as letters, numbers or combinations thereof and may form words, logos, designs and the like. The complex set of protrusions may include letters which spell a word or a symbol representing a designation of origin, The base surface extends in a direction substantially perpendicular to the axis of the filter. It surrounds the neck. The base surface may be convex.

The side surface of the neck extends in a direction substantially parallel to said filter axis. The elongated protrusion extends along the side surface from the bottom edge of the side surface of the neck or may extend from a location proximate the bottom edge toward the top edge.

The filter is designed to be used in combination with a housing associated with the water cooler. The housing has surface and a cavity with cavity ports. The cavity is configured to receive the neck of filter end. It includes a cavity wall adapted to align with the side surface of the filter neck. The cavity wall has a channel adapted to receive the elongated protrusion on the filter neck as the filter end is inserted into the housing. Once the filter end is fully inserted into the housing cavity, the elongated protrusion clears the channel and the filter end can be rotated relative to the housing. As the filter end is rotated, the housing surface cooperates with the inclined base surface portion to allow the protrusions and recesses to align. Once aligned, the protrusions are received in the recesses and the filter end is fully seated in the housing. In the fully seated position, the filter ports are aligned with the cavity ports.

In accordance with another aspect of the present invention, a filter is provided for a water cooler of the type that has a housing having a surface, a cavity and cavity ports. The filter has an end. The filter end includes a substantially cylindrical base having a base surface and a neck extending from the base surface. The neck has filter ports and a side surface. The side surface of the neck has first and second spaced elongated protrusions. The base surface has first and second inclined surface portions. Each of the inclined surface portions has a set of one or more protrusions. The filter end is configured to be received in the housing in bayonet-type fashion to align the filter ports and the cavity ports.

Each of the sets of protrusions takes the form of a complex sets of protrusions selected from the following group: geometric shapes, symbols, characters of various types such as letters, numbers or combinations thereof and may form words, logos, designs and the like. The protrusions may include letters which spell a word and/or a symbol representing a designation of origin.

The filter has an axis. The side surface of the neck extends in a direction substantially parallel to the filter. The side surface has a bottom edge. The elongated protrusions extend from a location proximate the bottom edge of the side surface or from a location proximate the bottom edge toward the top edge of the side surface.

The filter is designed to be used in combination with a housing associated with the water cooler. The housing has a surface, a cavity and cavity ports. The cavity is configured to receive the neck of the filter end. It has a cavity wall adapted to align with the side surface of the filter neck. The cavity wall includes first and second channels adapted to receive the first and second elongated protrusions, respectively, as the filter end is inserted into the housing. The housing surface has one or more recesses adapted to be received in the first and second sets of protrusions, respectively, after the filter is rotated relative to the housing, such that the sets of protrusions align with and are received in the recesses allowing the filter end to be fully seated in the housing and the filter ports aligned with the cavity ports.

In accordance with another aspect of the present invention, a filter for a water cooler is provided for use in combination with a housing associated with the water cooler. The housing includes a surface, a cavity and cavity ports. The filter has an end. The end of the filter has a substantially cylindrical base with a base surface and a neck extending from the base surface. The neck has filter ports and a side surface. The side surface of the neck has an elongated protrusion. The base surface includes an inclined surface portion having one or more complex sets of protrusions. The cavity includes a cavity wall adapted to align with the side surface of the filter neck. The cavity wall has a channel adapted to receive the elongated protrusion as the filter end is inserted into the housing. The housing surface has one or more complex sets of recesses and is configured to cooperate with the inclined base surface portion such that the filter can be rotated to a position in which the complex sets of protrusions align with and are received in the complex sets of recesses, such that the filter end is fully seated in the housing and he filter ports aligned with the cavity ports.

BRIEF DESCRIPTION OF THE SEVERAL VIEWS OF DRAWINGS

To these and to such other objects that may hereinafter appear, the present invention relates to a water cooler filter with secure bayonet-type connection as described in detail in the following specification and recited in the annexed claims, taken together with the accompanying drawings, in which like numerals refer to like parts and in which:

DETAILED DESCRIPTION OF THE INVENTION

Figure 1:
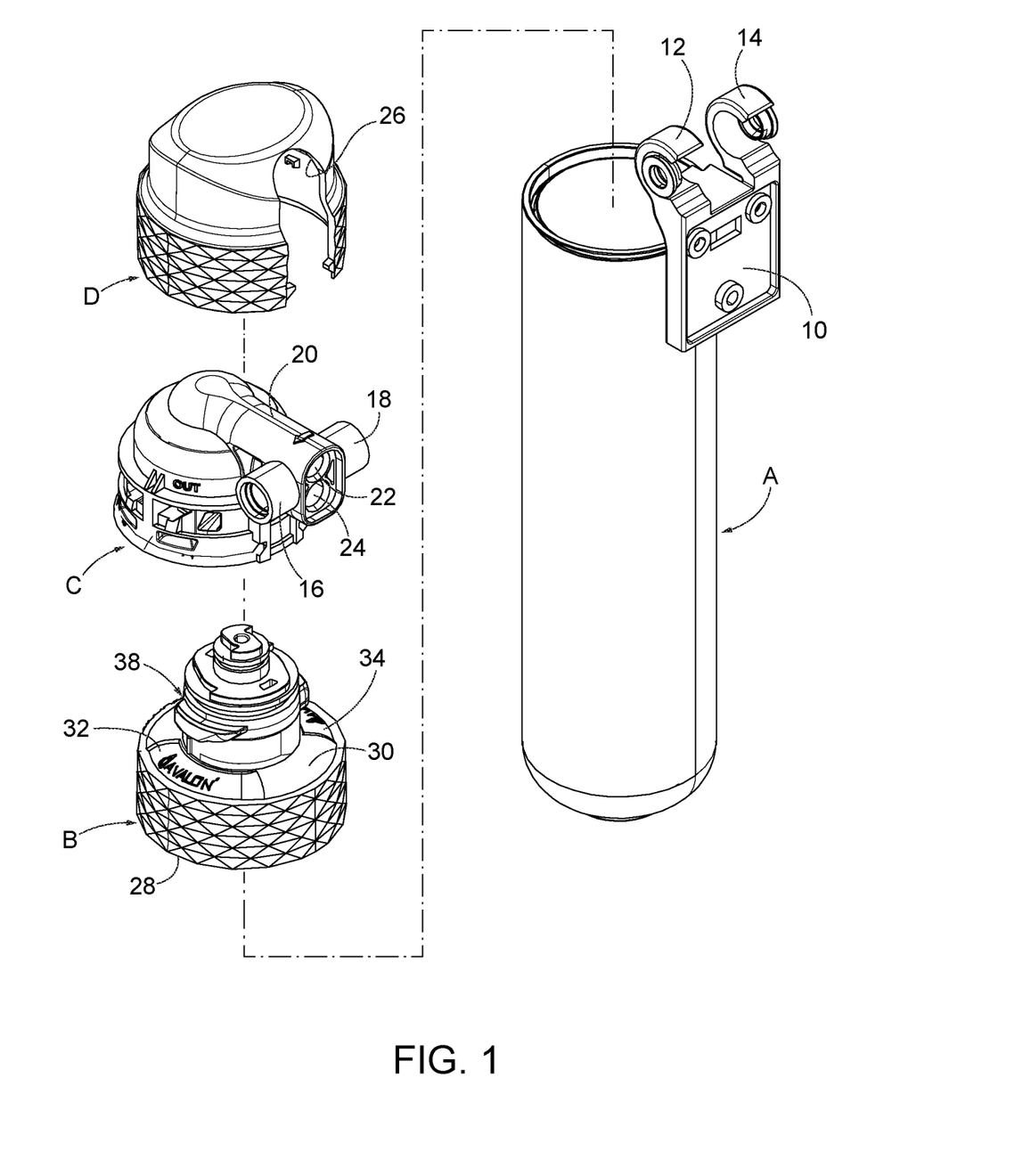
FIG. 1 is an exploded view of the filter canister, filter end, housing and cap.

As seen in FIG. 1, the filter assembly includes a hollow, generally cylindrical filter canister, generally designated A, designed to retain filter material through which water supplied to the water cooler (not shown) will pass before being cooled and dispensed by the water cooler. Canister A has an open top and a central axis.

The front end of the filter assembly, generally designated B, is designed to be permanently fixed to the open top of canister A. Filter front end B has entrance and exit ports which allow unfiltered water to enter the filter and filtered water to exit the filter.

Front end B of the filter is configured to be received in a housing, generally designated C. Housing C has inlet and outlet ports which, when the front end B of the filter is fully seated in the housing will align with the entrance and exit ports of the filter such that unfiltered water can flow through the housing into the filter and filtered water can flow from the housing to the water cooler (not shown) with which the housing is associated.

A cap, generally designated D, is configured to be received over the housing. Cap D is designed to "snap-fit" over the housing to protect the housing.

A bracket 10 is provided to support the filter assembly on a wall of the water cooler. The bracket includes first and second arms 12, 14 which extend upwardly from the body of the bracket. The upper ends of the bracket arms 12, 14 are curved to accept tubular parts 16, 18, respectively, which extend in opposite directions from a tube 20, the end of which is situated on the top of housing C. Tube 20 contains the ends of water intake and outflow pipes 22 and 24 which supply unfiltered water to the housing and transfer filtered water from housing to the water cooler.

Cap D has a side opening 26 to accommodate tube 20. Tube 20 extends through the side opening 26 of the cap when the cap is situated on the housing.

Figure 2:
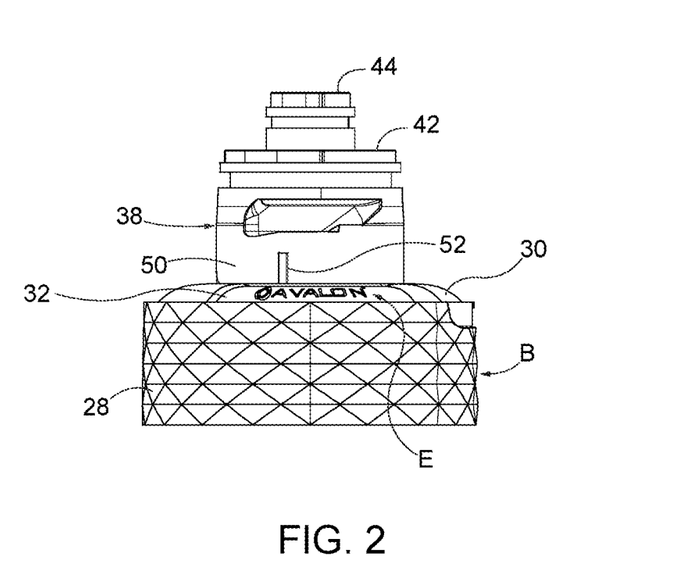
FIG. 2 is an elevation view of the front end of the filter.
Figure 3:
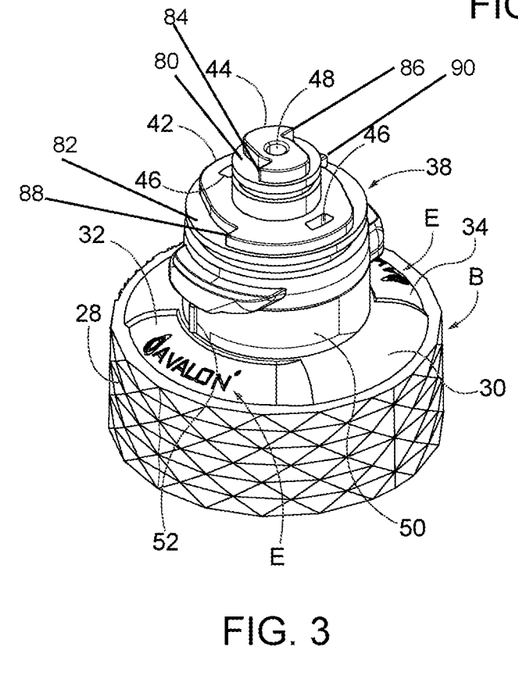
FIG. 3 is an isometric view of the filter end showing the top, front and side.
Figure 4:
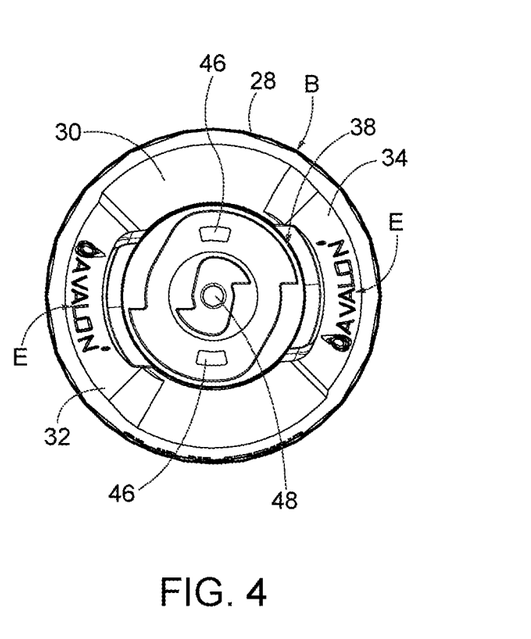
FIG. 4 is a top plan view of the filter end.

Referring now to FIGS. 2-4, filter end B includes a generally cylindrical base 28 which has a surface 30. Surface 30 extends in a direction substantially perpendicular to the axis of the filter. Surface 30 may be planar but is preferably slightly convex, as illustrated in the preferred embodiment shown in the figures.

Figure 5:
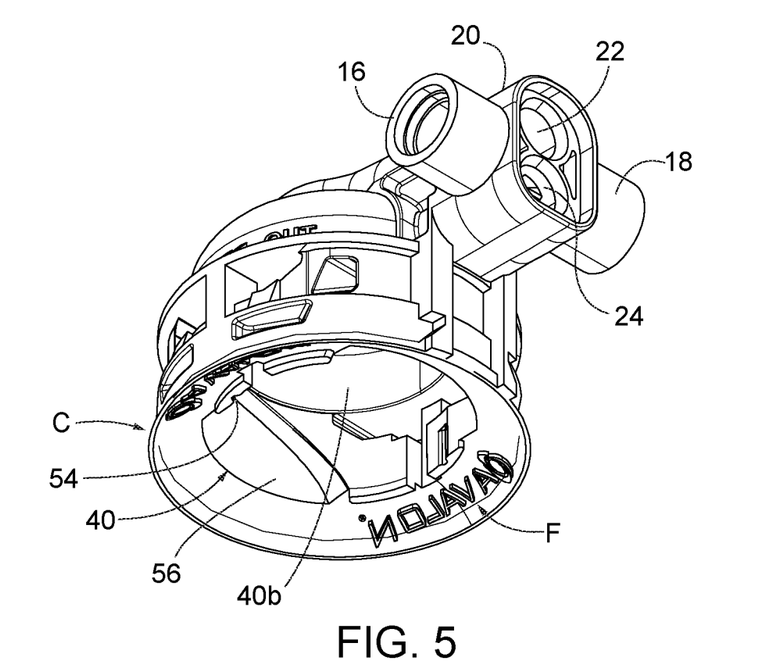
FIG. 5 is a perspective view of the housing showing the bottom, front and left side.
Figure 6:
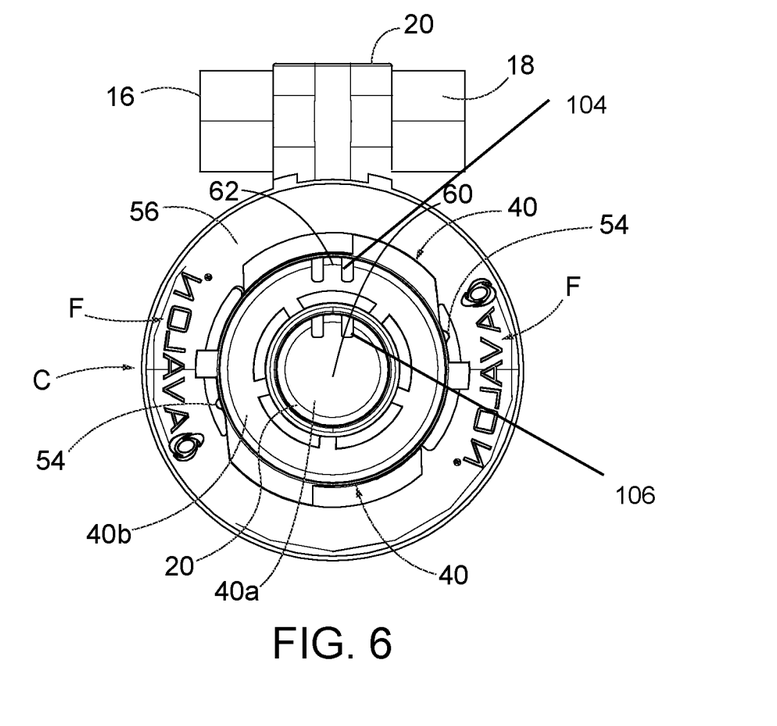
FIG. 6 is a bottom plan view of the housing.
Figure 7:
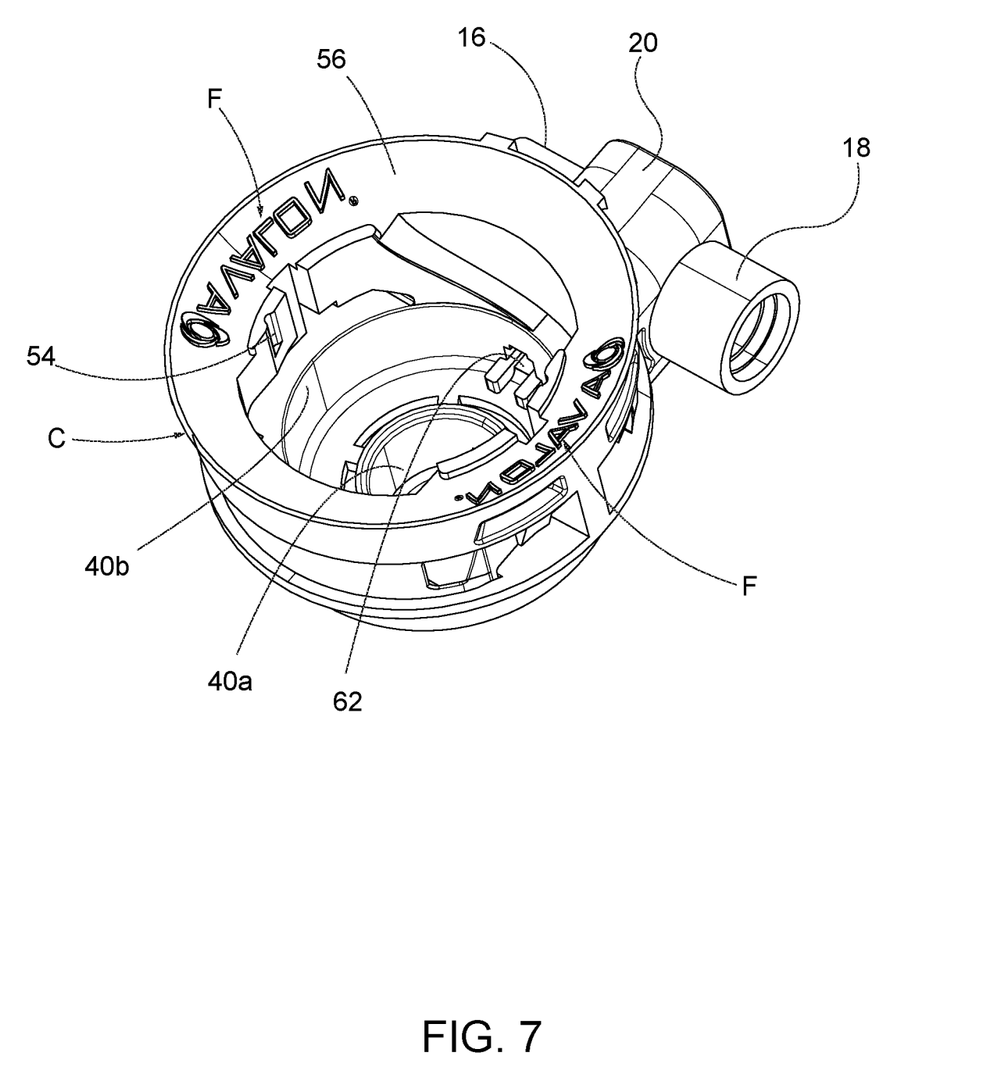
FIG. 7 is a perspective view of the housing showing the bottom, rear and right side.

Protruding upwardly from surface 30 of base 28 is a generally cylindrical neck, generally designated 38. Surface 30 surrounds neck 38. Neck 38 has various sections configured to cooperate with the contours of a cavity, generally designated 40, in housing C. Cavity 40 is best seen in FIGS. 5, 6 and 7 which show the underside of the housing.

The top portion of neck 38 includes two sections with generally planar top surfaces 42 and 44. Two water entrance ports 46 are situated in surface section 42. A single water exit port 48 is situated in surface section 44.

Neck 38 also has a side surface 50 which extends in direction substantially parallel to the axis of the filter. Protruding outwardly from opposed locations on neck surface 50 are spaced elongated protrusions 52, only one of which is visible in the figures. The other protrusion 52 is hidden in the figures but is preferably situated half way around surface 50 from the visible protrusion 52.

Protrusions 52 each extend in the axial direction along surface 50 from the bottom edge of side surface 50 or a location proximate the bottom edge of the side surface, toward the top edge of the side surface. The elongated protrusions extend only a part of the way up the side surface.

Protrusions 52 on the filter end B cooperate with channels 54 of cavity 40 in housing C to form a first interlock. In order for neck 38 of filter end B to be inserted into cavity 40 of housing C, the filter is rotated relative to housing C until elongated protrusions 52 in the side surface of the neck align with channels 54 in the cavity wall, the latter being seen in FIGS. 5, 6 and 7. Once that occurs, the protrusions pass through the aligned channels as the filter end is moved in the axial direction into the cavity, until base surface 30 abuts surface 56 on the housing. Surface 56 of the housing extends in a direction which is substantially perpendicular with the axis of the filter.

Base surface 30 has two spaced inclined surface portions 32 on opposite sides of the base. Each of those portions carry one or more protrusions. Preferably, each of the one or more protrusions includes a complex set of protrusions, generally designated E. As illustrated, the complex set of protrusions E form a logo and the word AVALON, for example.

In the fully inserted position, base surface 30 abuts housing surface 56 and the filter can be rotated towards its fully rotated position. As the filter is rotated, housing surface 56 cooperates with the inclined base surface portions 32 of the base surface to move the housing surface 56 away from the base surface 30a small distance to allow the recesses on housing surface 56, generally designated F, to align with and receive the protrusions E on base surface 30. Protrusions E and recesses F are configured to be identical in shape, size and layout as the recesses such that when the protrusions are aligned with the recesses, the protrusions will be received in the recesses and allow base surface 30 to again abut housing surface 56.

The height of the protrusions is small and thus the incline of the base surface portions 32 may also be small, only enough to allow the housing surface to move away from the base surface such that the protrusions and recesses can aligned.

See seen in FIG. 6, the housing cavity 40 configured to receive neck 38. Cavity 40 has a chamber 40a and a chamber 40b. Chamber 40a is situated at the top of the housing and has a smaller diameter than chamber 40b to accept the smaller diameter top portion of the neck. Chamber 40b has a larger diameter and is configured to receive the larger bottom portion of the neck. The cavity is contoured to tightly accept the neck when the filter end is inserted into the housing in order to isolate the chambers 40a and 40b.

Port 48 in surface 44 of neck 38 is connected to chamber 40a when the filter end is received in the housing. An opening 60 in the wall of chamber 40a connects the chamber to pipe 22 of tube 20.

Ports 46 in surface 42 of neck 38 are connected to chamber 40b when the filter end is received in the housing. An opening 62 in the wall of chamber 40b connects chamber 40b and pipe 24. Chambers 40a and 40b are isolated from each other by neck 38 such that unfiltered water must pass through the filter material in the canister to get from the entrance port to the exit port of the filter. In order to do that, the parts of both interlocks must be interengaged such that the filter can be rotated to its fully rotated position and fully seated within the housing.

When the protrusions of each of the protrusion sets E are aligned with the recesses in each of the sets of recesses F, the filter end is locked in the housing. In the position, the filter ports and the housing ports are aligned and sealed to each other. Unfiltered water can then freely move from the supply, through the filter assembly and to the water cooler to be cooled and dispensed.

While the complex sets of protrusions/recesses which form the second interlock can be formed of in any pattern, as long as they are suitably complex, it is preferred that the individual parts be separated by spaces and be selected from the following group: geometric shapes, symbols, characters of various types such as letters, numbers or combinations thereof and may form words, logos, designs and the like.

In the preferred embodiment of the present invention illustrated in the figures, the second interlock is shown as spaced letters which form the word AVALON preceded by a symbol in the form of a logo, by way of example.

Referring generally to FIGS. 1-7, in one embodiment, a filter for a water cooler is provided that includes a housing C and a filter end B having an axis. Housing C includes a housing surface 56 defining a cavity 40 in the housing with a plurality of cavity ports 60, 62 therein, and one or more recesses F on the housing surface 56. Filter end B includes a substantially cylindrical base 28, a base surface 30, and a neck 38 extending from base surface 30. Base surface 30 extends in a plane substantially perpendicular to the filter end axis.

Neck 38 has a bottom section 70, a lower top section 72 extending upward from the bottom section 70, an upper top section 74 extending upward from the lower top section 72 and dimensionally smaller (e.g., smaller diameter) than the lower top section 72, and a plurality of filter ports 48, 46. The bottom section has a side surface, the upper top section 74 has a first planar top surface 76, and the lower top section 72 has a second planar top surface 78.

The upper top section 74 includes a planar step 80 extending upward from the first planar surface 76. Step 80 forms first and second teeth 84, 86 extending outward from a center (e.g., axis) of the upper top section 74. First and second teeth 84, 86 include a first and second edge 96, 98. First and second edges 96, 98 include planar surfaces that are parallel to each other and offset from the center of the upper top section 74. The planar surfaces may be orthogonal to the first planar surface 76 and/or the planar step 80.

The lower top section 72 includes a planar step 82 extending upward from the second planar surface 78. Step 82 forms third and fourth teeth extending outward from a center of the lower top section. Third and fourth teeth 88, 90 include a third and fourth edge 100, 102. Third and fourth edges 100, 102 include planar surfaces that are parallel to each other and offset from the center of the lower top section 72. Similarly, the planar surfaces of may be orthogonal to the second planar surface 78 and/or the planar step 82. First and third edges 96, 100 may be colinear, and second and fourth edges 98, 102 may be colinear, as shown in the figures.

Base surface 28 includes one or more inclined surface portions 32, 34 that include one or more base surface protrusions E extending from the one or more inclined surface portions. The one or more recesses F on the housing surface 56 are configured to receive the one or more base surface protrusions E.

The cavity in housing 40 includes an upper chamber 40a and lower chamber 40b. The upper chamber 40a is configured to receive the upper top section of neck 74 and the lower chamber 40b is configured to receive the lower top section of neck 72.

Filter end B is configured to be received in the housing C in bayonet-type fashion to align the plurality of filter ports 48, 46 with the plurality of cavity ports 60, 62.

In one embodiment, the one or more base surface protrusions E includes at least one of geometric shapes, symbols, alphanumeric characters, words, logos and designs.

In one embodiment, base surface 30 is convex and surrounds neck 38.

In one embodiment, upper top section 74 has a groove 92 separating the first planar surface 76 from the second planar top surface 78.

In one embodiment, groove 92 separating the first planar surface 76 from the second planar top surface 78 extends circumferentially about the upper top section 74.

In one embodiment, lower top section 72 has a groove 94 separating the second planar top surface 78 from the bottom section 70.

In one embodiment, groove 94 separating the second planar top surface 78 from the bottom section 70 extends circumferentially about the lower top section 72.

In one embodiment, at least one of the plurality of filter ports is disposed on the planar step 80 extending upward from the first planar surface 76.

In one embodiment, at least one of the plurality of filter ports is disposed on the planar step 82 extending upward from the second planar surface 78.

In one embodiment, one or more recessed side surface portions 52 extends in a direction substantially parallel to the filter end axis and includes a bottom edge and a top edge. One or more elongated protrusion 52 extends from the bottom edge of the one or more recessed side surface portions toward the top edge of the one or more recessed side surface portions.

In one embodiment, the housing comprises an upper tooth stop 104 extending inward toward a center of the upper chamber and a lower tooth stop 106 extending inward toward a center of the lower chamber. The upper tooth stop 104 is configured to engage either of the first and second edges 96, 98 of the first and second teeth, and the lower tooth stop 106 is configured to engage either of the third and fourth 100, 102 edges of the third and fourth teeth.

In one embodiment, at least one of the lower and upper tooth stops have an opening therein 62 for receiving flow from at least one of the plurality of filter ports.

In one embodiment, the housing cavity is configured to receive the filter end neck and has a cavity wall adapted to align with the side surface of the filter end neck. The cavity wall includes a channel through which the one or more elongated protrusions pass as filter end neck 38 is inserted into the housing such that the base surface abuts the cavity wall and the filter end neck 38 can be rotated relative to the housing. The housing surface is configured to cooperate with the one or more inclined surface portion of the base surface such that the one or more recesses can be aligned with and receive the one or more base surface protrusions. The filter end neck 38 is fully seated into the housing with the plurality of filter ports aligned with the plurality of cavity ports.

In one embodiment, the side surface of the neck includes one or more elongated protrusions 52.

While only a single preferred embodiment of the present invention hse been disclosed for purposes of illustration, it is obvious that many modifications and variations could be made thereto. It is intended to cover all of those modifications and variations which fall within the scope of the present invention, as defined by the following claims:

I claim:

1. A filter for a water cooler comprising a housing with a cavity and cavity ports, said filter comprising:
   an end and an axis, said filter end comprising:
   a cylindrical base having a base surface at least a portion of which extends in a plane perpendicular to said filter axis; and
   a filter neck extending from said base surface, said neck having filter ports and a side surface,
   said neck having a bottom section, a lower top section extending upward from the bottom section, an upper top section extending upward from the lower top section and dimensionally smaller than the lower top section, and a plurality of filter ports,
   said bottom section having a side surface,
   said upper top section having a first planar top surface,
   said lower top section having a second planar top surface,
   said upper top section comprising a planar step extending upward from the first planar surface and wherein the planar step forms first and second teeth extending outward from a center of the upper top section, said first and second teeth comprising a first and second edge, wherein said first and second edges are parallel to each other and offset from the center of the upper top section, said side surface of said neck comprising an elongated protrusion extending in a direction parallel to said axis, said base surface comprising an inclined surface portion having one or more protrusions extending from said inclined surface portion, said filter end being configured to be received in the housing in bayonet-type fashion to align said filter ports and the cavity ports.

2. The filter of claim 1 wherein said one or more protrusions on said inclined surface portion of said base surface comprises a set of protrusions selected from the following group: geometric shapes, geometric shapes, symbols, characters, letters, numbers, words, logos, designs, and combinations thereof.

3. The filter of claim 1 wherein said one or more protrusions on said inclined surface portion of said base surface comprise letters which spell a word.

4. The filter of claim 1 wherein said one or more protrusions on said inclined surface portion of said base surface comprise a symbol representing a designation of origin.

5. The filter of claim 1 wherein said one or more protrusions on said inclined surface portion of said base surface extend along said inclined surface portion of said base surface.

6. The filter of claim 1 wherein said at least a portion of said base surface is convex.

7. The filter of claim 1 wherein said base surface surrounds said neck.

8. The filter of claim 1 wherein said side surface of said neck extends in a direction parallel to said filter axis.

9. The filter of claim 1 wherein said side surface of said neck has a bottom edge at an intersection of the side surface with the bottom surface and a top edge opposite the bottom edge and wherein said elongated protrusion extends from said bottom edge of said side surface of said neck.

10. The filter of claim 1 wherein said side surface of said neck has a bottom edge at an intersection of the side surface with the bottom surface and a top edge opposite the bottom edge and wherein said elongated protrusion extends from a location proximate said bottom edge toward said top edge.

11. The filter of claim 1 configured to cooperate with a housing associated with the water cooler, said housing comprising:

a surface, a cavity with cavity ports, said housing cavity being configured to receive said filter end neck and comprising a cavity wall adapted to align with said side surface of said filter neck, said housing surface comprising one or more recesses, said cavity wall comprising a channel through which said elongated protrusion passes as said filter end is inserted into said housing such that said base surface abuts said housing surface and said filter end can be rotated relative to said housing, said housing surface being configured to cooperate with said inclined surface portion of said base surface such that said one or more recesses can be aligned with and receive said one or more protrusions, wherein said filter end is fully seated into said housing with said filter ports aligned with said cavity ports.

12. The filter of claim 1 said lower top section comprising:

a second planar step extending upward from the second planar surface and wherein the second planar step forms third and fourth teeth extending outward from a center of the lower top section, said third and fourth teeth comprising a third and fourth edge, wherein said third and fourth edges are parallel to each other and offset from the center of the lower top section, and wherein said first and third edges are colinear and said second and fourth edges are colinear.

13. The filter of claim 1 said cavity in the housing comprising an upper chamber and lower chamber, wherein the upper chamber is configured to receive the upper top section of the neck and the lower chamber is configured to receive the lower top section of the neck.

14. The filter of claim 1 wherein said upper top section further has a groove separating the first planar surface from the second planar top surface.

15. The filter of claim 14 wherein the groove separating the first planar surface from the second planar top surface extends circumferentially about the upper top section.

16. The filter of claim 1 wherein said lower top section further has a groove separating the second planar top surface from the bottom section.

17. The filter of claim 16, wherein the groove separating the second planar top surface from the bottom section extends circumferentially about the lower top section.

18. The filter of claim 1 wherein at least one of the plurality of filter ports is disposed on the planar step extending upward from the first planar surface.

19. The filter of claim 1, wherein at least one of the plurality of filter ports is disposed on the second planar step extending upward from the second planar surface.

20. The filter of claim 13 wherein the housing comprises an upper tooth stop extending inward toward a center of the upper chamber and a lower tooth stop extending inward toward a center of the lower chamber, wherein the upper tooth stop is configured to engage either of the first and second edges of the first and second teeth, and the lower tooth stop is configured to engage either of the third and fourth edges of the third and fourth teeth.

21. The filter of claim 20 wherein at least one of the lower and upper tooth stops have one of said cavity ports therein for receiving flow from at least one of the plurality of filter ports.

* * * * *